United States Patent [19]

Schreder

[11] Patent Number: 5,504,482
[45] Date of Patent: Apr. 2, 1996

[54] AUTOMOBILE NAVIGATION GUIDANCE, CONTROL AND SAFETY SYSTEM

[75] Inventor: Kenneth D. Schreder, Lake Forest, Calif.

[73] Assignee: Rockwell International Corporation, Seal Beach, Calif.

[21] Appl. No.: 76,502

[22] Filed: Jun. 11, 1993

[51] Int. Cl.$^6$ ............................................. G08G 1/123
[52] U.S. Cl. .......................... 340/995; 340/988; 364/449
[58] Field of Search ................................... 340/995, 990, 340/988, 905, 438, 439, 435, 903; 364/449, 436; 180/282

[56] References Cited

U.S. PATENT DOCUMENTS

| | | | |
|---|---|---|---|
| 4,369,426 | 1/1983 | Merkel | 340/436 |
| 4,939,662 | 7/1990 | Nimura et al. | 340/995 |
| 5,122,796 | 6/1992 | Beggs et al. | 340/903 |
| 5,172,321 | 12/1992 | Ghaem et al. | 340/995 |
| 5,243,528 | 9/1993 | Lefebvre | 340/995 |
| 5,272,638 | 12/1993 | Martin et al. | 340/995 |
| 5,293,163 | 3/1994 | Kakihara et al. | 340/995 |
| 5,293,318 | 3/1994 | Fukushima | 340/995 |

OTHER PUBLICATIONS

Motorola, *Intelligent Vehicle Highway Systems*, published in 1993.
Delco, "Other Vendors Display Navigation Wares at IVHS Event", *Inside IVHS*, Apr. 26, 1993, p. 6.

*Primary Examiner*—Brent A. Swarthout
*Attorney, Agent, or Firm*—George A. Montanye; David J. Arthur; Susie H. Oh

[57] ABSTRACT

An automobile is equipped with an inertial measuring unit, an RF GPS satellite navigation unit and a local area digitized street map system for precise electronic positioning and route guidance between departures and arrivals, is equipped with RF receivers to monitor updated traffic condition information for dynamic rerouting guidance with a resulting reduction in travel time, traffic congestion and pollution emissions, is also equipped with vehicular superceding controls substantially activated during unstable vehicular conditions sensed by the inertial measuring unit to improve the safe operation of the automobile so as to reduce vehicular accidents, and is further equipped with telecommunications through which emergency care providers are automatically notified of the precise location of the automobile in the case of an accident so as to improve the response time of road-side emergency care.

4 Claims, 2 Drawing Sheets

FIG. 2

AUTOMOBILE NAVIGATION GUIDANCE, CONTROL AND SAFETY SYSTEM

FIELD OF INVENTION

The present invention relates to inertial navigation, automobile control, three dimensional satellite positioning, vehicular traffic management, automobile telecommunications, automobile radio data systems, traffic monitoring systems, local area digitized traffic maps, route guidance systems, road side emergency care and pollution control. More specifically, the present invention relates to integrating, adapting and improving various technologies and methods to provide a comprehensive vehicular route guidance, control and safety system for reducing travel time, pollution emissions, traffic accidents and road side emergency care response time.

BACKGROUND OF THE INVENTION

Modern automobile travel has long been plagued by excessive traffic congestion and resulting air pollution from continually increasing automobile use. Drivers have long sought optimum travel routes to minimize drive time, and governmental agencies have sought to reduce air pollutants, as is well known. Local area radio and TV stations have transmitted "sig-alerts" to inform drivers of blocked or congested traffic routes so that drivers familiar with various routes to their respective destinations can alter enroute their planned route to minimize drive time which is often unproductive and represents an aggregate burden on society. Such "sig-alerts" disadvantageously require real-time receptions by the drivers prior to entering the congested traffic area. Such "sig-alerts" are often missed when drivers are not tuned into the transmitting station at the proper time. Moreover, drivers tend to learn and routinely follow the same route day after day without becoming familiar with alternate routes even in the face of heavy recurring congestion. Road side signs have also long been used to warn drivers and redirect traffic during road construction or traffic congestion. For example, posted detour signs and electronic road-side billboards have been used to suggest or require alternative routes. Some electronic billboards have been posted on main traffic arteries, warning of pending traffic blockage or congestion. However, these signs and billboards also suffer from being posted too near to the point of congestion or blockage preventing meaningful re-evaluation of the planned route and alteration of that route, primarily because of the required close proximal relationship between the sign location and the point of congestion or blockage. There exists a continuing need to improve the reception of accurate traffic congestion and alternative route information.

Local area radio and TV stations have broadcasted predicted pollution levels, that is, "smog alerts" with a view of altering driver use, such as increased car pooling or collective rapid transit use on days of expected high pollution levels, to minimize and reduce those levels. "Smog alerts" suffer from the same disadvantages as "sig-alerts" in that drivers may not be informed in time to take alternative actions. Moreover, the independent nature of human beings and their respective differing destinations tend to defeat an appropriate communal response to such "smog alerts". There also exists a need to continually reduce automobile travel time and the resulting environmental pollutants by optimizing the travel time or travel distance of vehicles between departure locations and arrival destinations.

Governmental agencies have provided emergency care services in response to road side vehicular accidents, as is well known. Governmental agencies have adopted the well known "911" emergency call method through which road accidents are reported and followed by the dispatching of emergency care services including police, fire and paramedic services using dedicated emergency RF radio systems. Such RF radio systems and methods often require the reporting of the accident by private citizens who are typically either witnesses to the accident or are involved in the accident. However, such systems and methods fail when such victims are incapacitated by injury, or when such witnesses are unable to quickly locate an operating phone especially in remote areas. Moreover, critical time is often lost when searching for a telephone to place the "911" call on a remote telephone. Further still, misinformation may be inadvertently given by those reporting victims and witnesses unfamiliar with the location of the accident thereby directing the emergency care provider to the wrong location. There exists a continuing need to more expeditiously provide accurate vehicular traffic accident information to emergency care providers.

Drivers have heretofore operated automobiles in their daily lives but nonetheless do at times operate their respective vehicles at excessive speeds or when exceeding other safe operating conditions resulting in accidents. Modern day automobiles have been adapted with increasingly sophisticated vehicular electronic controls including power steering, four-wheel steering, anti-lock braking, engine governing, automatic transmission, cruise control, and suspensions lifting controls. Additionally, modern automobiles have been increasingly adapted with electro-mechanical sensing and control using electronic processing, including the use of microprocessor based electronic systems. The increased sophistication of electronic vehicular sensing and control is well suited for microcomputer processing. The accuracy, sensitivity and operational speed of electronic controls are known to far exceed that of the human mind. There exists a continuing need to adapt and improve real-time vehicular dynamic motion and operating condition sensing and control for corrective vehicular control to maintain as best possible the automobile within safe operating limits. These adaptions and improvements are well suited for automatic processing capabilities of modern day micro-electronics.

Automobiles have also been adapted with experimental local area digitized road map systems which display a map portion of interest. The driver can locate departure and destination points on the map, and then visually follow the displayed map respecting the current position of the vehicle, as the driver travels toward the desired destination point. The map systems display a cursor to locate the current position of the moving vehicle on the displayed map. The portion of the map that is displayed is periodically adjusted to keep the current position cursor in the center of the displayed map portion. The map systems use a compass and a wheel sensor odometer to move the current position from one location to another as the vehicle travels on the road. The use of such map display systems requires the driver to repetitively study the map and then mentally and repetitively determine and select travel routes diverting attention away from the safe operation of the vehicle. The display of the digitized map with a current position cursor tends to increase traffic accidents, rather than promote safe operation. Also, the compass and wheel odometer technology causes map position error drifts over distance, requiring recalibration after traveling only a few miles. Moreover, the use of such map systems disadvantageously requires the entry of the departure point each time the driver begins a new route.

Additionally, the digitized map systems do not perform route guidance indicating a route through which the driver should take to reach a particular destination point. The digitized map systems are not dynamically updated with current traffic information, such as detours for road construction, blocked routes due to accidents, and delayed travel times due to heavy traffic congestion. Furthermore, such map systems do not provide route guidance based upon varying requirements, such as, least route time, least travel distance, cost-effective least traffic stops and turns, nor a combination thereof, nor based upon dynamic updated current traffic conditions. There exists a continuing need to improve digitized map systems with a driver friendly interface which reduces diversion away from the safe attentive operation of the vehicle to promote accident free dynamic route guidance vehicular operation.

While the aforementioned "sig-alerts", "smog-alerts", "911", detour signs, electronic billboard and digitized map systems and methods have had some success, there exists a wide range of technologies that have disadvantageously not been applied in a comprehensive integrated manner to significantly improve route guidance, reduce pollution, improve vehicular control and increase safety associated with the common automobile experience. For example, it is known that gyro based inertial navigation systems have been used to generate three-dimensional position information, including exceedingly accurate acceleration and velocity information over a relatively short travel distance, and that GPS satellite positioning systems can provide three-dimensional vehicular positioning and epoch timing, with the inertial system being activated when satellite antenna reception is blocked during "drop out" for continuous precise positioning. It is also known that digitized terrain maps can be electronically correlated to current vehicular transient positions, as have been applied to military styled transports and weapons. For another example, it is also known that digitally encoded information is well suited to RF radio transmission within specific transmission carrier bands, and that automobiles have been adapted to received AM radio, FM radio, and cellular telecommunication RF transmissions. For yet another example, it is further known that automobile electronic processing has been adapted to automatically control braking, steering, suspension and engine operation, for example, anti-lock braking, four-wheel directional steering, dynamic suspension stiffening during turns and high speed, engine governors limiting vehicular speed, and cruise control for maintaining a desired velocity. For still another example, traffic monitors, such as road embedded magnetic traffic light sensor loops and road surface traffic flow meters have been used to detect traffic flow conditions. While these sensors, meters, elements, systems and controls have served limited specific purposes, the prior art has disadvantageously failed to integrate them in a comprehensive fashion to provide a complete dynamic route guidance, dynamic vehicular control, and safety improvement system.

Recently, certain experimental integrated vehicular dynamic guidance systems have been proposed. Motorola has disclosed an Intelligent Vehicle Highway System in block diagram form in copyright dated 1993 brochure. Delco Electronics has disclosed another Intelligent Vehicle Highway System also in block diagram form in Automotive News published on Apr. 12 1993. These systems use compass technology for vehicular positioning. However, displacement wheel sensors are plagued by tire slippage, tire wear and are relatively inaccurate requiring recalibration of the current position. Compasses are inexpensive, but suffer from drifting particularly when driving on a straight road for extended periods. Compasses can sense turns, and the system may then be automatically recalibrated to the current position based upon sensing a turn and correlating that turn to the nearest turn on a digitized map, but such recalibration is still prone to errors during excessive drifts. Moreover, digitized map systems with the compass and wheel sensor positioning methods operate in two dimensions on a three-dimensional road terrain injecting further errors between the digitized map position and the current vehicular position due to a failure to sense distance traveled in the vertical dimension.

These Intelligent Vehicle Highway Systems appear to use GPS satellite reception to enhance vehicular tracking on digitized road maps as part of a guidance and control system. These systems use GPS to determine when drift errors become excessive and to indicate that recalibration is necessary. However, the GPS reception is not used for automatic accurate recalibration of current vehicular positioning, even though C-MIGITS and like devices have been used for GPS positioning, inertial sensing and epoch time monitoring, which can provide accurate continuous positioning.

These Intelligent Vehicle Highway Systems use the compass and wheel sensors for vehicular positioning for route guidance, but do not use accurate GPS and inertial route navigation and guidance and do not use inertial measuring units for dynamic vehicular control. Even though dynamic electronic vehicular control, for example, anti-lock braking, anti-skid steering, and electronic control suspension have been contemplated by others, these systems do not appear to functionally integrate these dynamic controls with an accurate inertial route guidance system having an inertial measuring unit well suited for dynamic motion sensing. There exists a need to further integrate and improve these guidance systems with dynamic vehicular control and with improved navigation in a more comprehensive system.

These Intelligent Vehicle Highway Systems also use RF receivers to receive dynamic road condition information for dynamic route guidance, and contemplate infrastructure traffic monitoring, for example, a network for road magnetic sensing loops, and contemplate the RF broadcasting of dynamic traffic conditions for dynamic route guidance. The disclosed two-way RF communication through the use of a transceiver suggests a dedicated two-way RF radio data system. While two-way RF communication is possible, the flow of necessary information between the vehicles and central system appears to be exceedingly lopsided. The flow of information from the vehicles to a central traffic radio data control system may be far less than the required information from traffic radio data control system to the vehicles. It seems that the amount of broadcasted dynamic traffic flow information to the vehicles would be far greater than the information transmitted from the vehicles to the central traffic control center. For example, road side incident or accident emergency messages to a central system may occur far less than the occurrences of congested traffic points on a digitized map having a large number of road coordinate points.

Conserving bandwidth capacity is an objective of RF communication systems. The utilization of existing infrastructure telecommunications would seem cost-effective. AT&T has recently suggested improving the existing cellular communication network with high speed digital cellular communication capabilities. This would enable the use of cellular telecommunications for the purpose of transmitting digital information encoding the location of vehicular incidents and accidents. It then appears that a vehicular radio data system would be cost-effectively used for unidirectional broadcasting of traffic congestion information to the general traveling public, while using existing cellular telecommunication systems for transmitting emergency information. The communication system should be adapted for the expected volume of information. The Intelligent Vehicular Highway Systems disadvantageously suggest a required two-way RF radio data system. The vast amount of information that can be transmitted may tend to expand and completely occupy a dedicated frequency bandwidth. To the extent that any system is bidirectional in operation tends to disadvantageously require additional frequency bandwidth capacity and system complexity. These and other disadvantages are solved and reduced using the present invention.

SUMMARY OF THE INVENTION

An object of the present invention is to provide drivers of automobiles with a route guidance system.

Another object of the present invention is to improve the safety of drivers in vehicles which have developed road instability during operation.

Another object of the present invention is to improve the reporting of road side accidents with precise accident location information.

Another object of the present invention is to reduce vehicular emission of air pollutants using a route guidance system.

Yet another object of the present invention is to provide a navigation system which accurately positions a vehicle within a local area digitized road map.

Yet another object of the present invention is to provide a driver friendly route guidance system.

Yet another object of the present invention is to provide a vehicular navigation and guidance system which computes optimum routes between departure and destination points.

Still another object of the present invention is to provide a vehicular guidance system which dynamically reroutes travel routes based upon updated and current traffic flow information.

Yet another object of the present invention is to provide for the automatic transmission of emergency calls in the event of a road side incident.

A further object of the present invention is to provide vehicular RF data reception suitable for receiving current traffic flow information.

A further object of the present invention is to provide precise continuous vehicular positioning information using RF satellite and inertial navigation.

A further object of the present invention is to improve driver safety by providing real-time vehicular dynamic control for automatic corrective action during vehicular instability using inertial measuring.

Yet a further object of the present invention is to provide precise positioning of vehicles in emergency situations using vehicular inertial and satellite navigation and telecommunications.

Still a further object of the present invention is to provide a comprehensive and integrated vehicular guidance, control and safety system using vehicular inertial and electronic sensing, processing and control in combination with RF communications, RF satellite and inertial navigation, and digitized road maps.

The vehicular navigation system of the present invention integrates an inertial navigation unit and a GPS navigation unit to provide continuous accurate vehicular positioning even during periods of satellite drop out when the reception of GPS navigation signals is blocked by interference. Inertial sensing and navigation in combination with GPS positioning is applied to common transportation vehicles. The GPS RF navigation unit is used to locate the vehicle in three dimensions. The inertial navigation unit is used to modify the current positioning during satellite drop out. Inertial navigation provides vehicular movement information during GPS drop out. GPS and inertial navigation elements combine to provide continuous accurate positioning. Accurate vehicular positioning is combined with the use of digitized road maps for route guidance based upon a variety of routing algorithms, for examples, least time, least distance, least turns or least stops. The improved navigation system reduces problems associated with error drifts over extended traveled distances, and reduces the need for manual recalibration and starting point reentry. The inertial vehicular navigation system is not subject to the same drift errors associated with compass, wheel sensing and GPS positioning, and the resulting need to reenter current positions. GPS monitoring is used to recalibrate vehicular position on a recurring basis.

The inertial navigation unit is also used to sense vehicle instabilities. The present invention includes a vehicular dynamic control system for improved safe operation of the vehicle. Software programmed embedded processors are used to interpret vehicular sensors and inertial information. Advantages of inertial measuring include the computation of accurate instantaneous acceleration and velocity parameters. These parameters are useful in the detection of unstable vehicular conditions. The present invention is enhanced by dynamic superseding automatic control of the vehicle in the case of detected unstable conditions, such as skidding and sliding of the vehicle.

Digitized maps, computer processing and the inertial and GPS navigation units are used to correlate current positions within a local area digitized road map and used for vehicle route guidance to a destination. A radio data system is used to receive up-to-date traffic flow information. The dynamic traffic flow information locates and characterizes the type of traffic flow, including X-Y map coordinates with traffic codes, for examples, road construction, detours, congestion levels, traffic flow rates, hazardous material spills, parking capabilities, weather conditions, among other codes. The digitized maps, computer processing, inertial and GPS navigation systems and the radio data system are used to dynamically reroute the vehicle after departure.

Inertial measuring senses accident or incident conditions. RF Telecommunications is then used to automatically report the accident or incident to emergency road-side service providers. The digitized maps, navigation system with current vehicular position and computer processing are used to automatically initiate and communicate emergency calls with precise location information to the emergency service providers to improve their response time to emergency incidents. These and other advantages will become more apparent from the following detailed description of the preferred embodiment.

DETAILED DESCRIPTION OF THE PREFERRED EMBODIMENT

Figure 1:
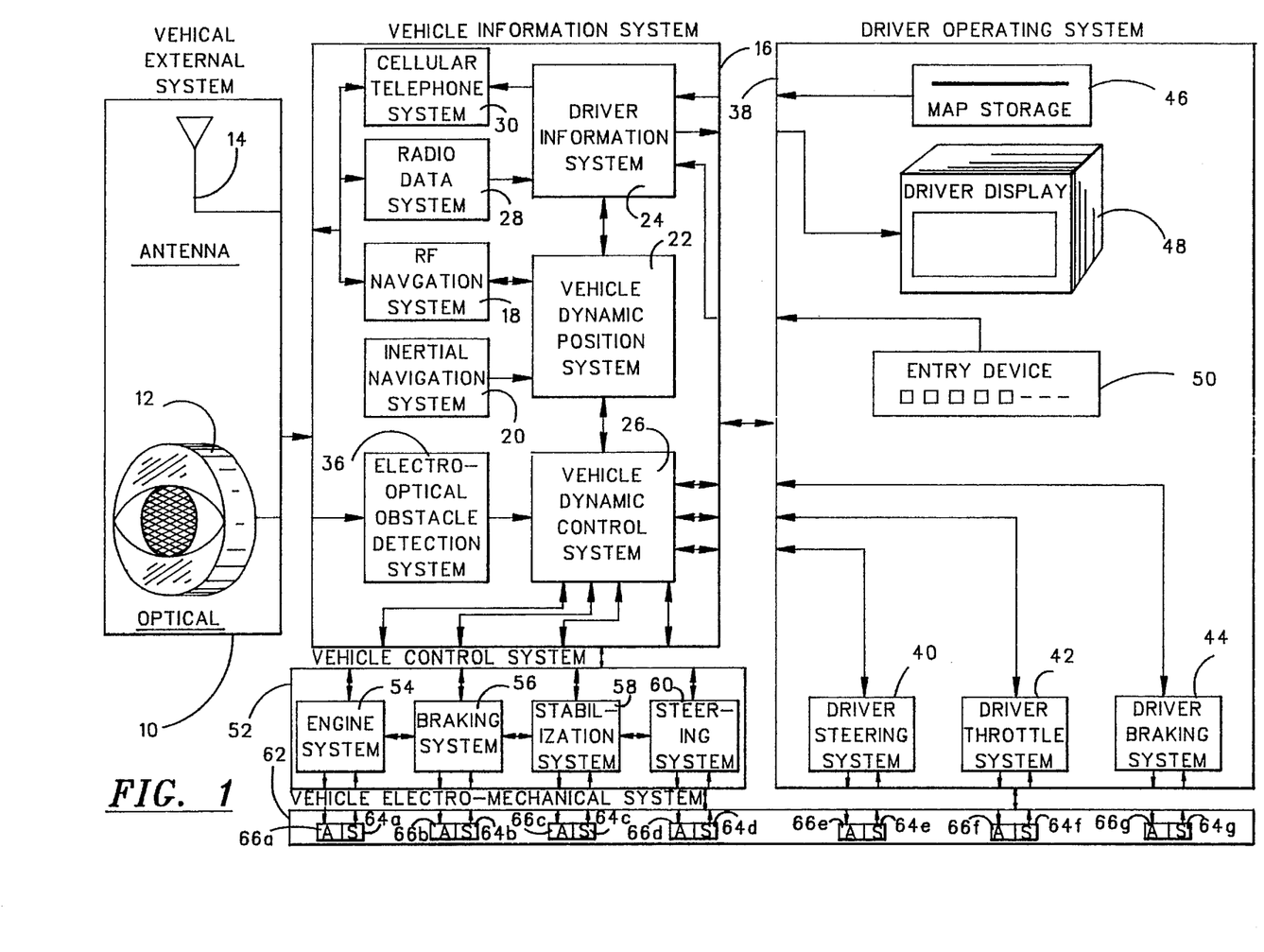
FIG. 1 is a block diagram of an automobile navigation guidance, control and safety system.

Referring to FIG. 1, an automobile navigation guidance, control and safety system of the present invention has various internal processing elements having necessary processors and programmed memories. A vehicle external system 10 comprises an optical sensor 12 primarily for detecting road obstacles, and one or more antenna 14 for RF reception and transmission. The vehicle external system 10 provides a vehicle information system 16 with optical sensor inputs and RF transmission signal inputs. The vehicle information system 16 includes an RF navigation system 18, an inertial navigation system 20 and a vehicle dynamic position system 22 collectively operating to determine dynamic vehicular positioning. The RF navigation system 18 is a GPS receiver which may be an RI NAVCOR V component in the preferred form. The inertial navigation system 20 is a modified GIC-100 gyro system, in the preferred form, which generates two dimensional acceleration and velocity information. An improved gyro system could be used to provide three-dimensional acceleration and velocity information. The position system 22 is an interface processor for processing signals from the RF navigation system 18 and the inertial navigation system 20, and computes equations for three-dimensional positioning, that is, longitude, latitude and altitude information, and equations for motion for providing two-dimensional acceleration and velocity information.

The vehicle position system 22 transfers three-dimensional current position and time information to a driver information system 24 and also transfers motion information to a vehicular dynamic control system 26. The driver information system 24 provides the computing capability for route guidance planning as adjusted by dynamic traffic flow information received through a radio data system 28.

The vehicle information system 16 preferably includes a cellular telephone system 30 for transmitting emergency calls to road side emergency care providers. The calls would preferably be placed over a digital cellular telephone RF channel and include epoch time and vehicle location, and preferably would also include the vehicle heading just prior to the conditions that caused the activation of the emergency call so that the road-side emergency care providers would be informed as to which side of the road is the reporting vehicle to more precisely locate the vehicle to reduce the response time of emergency road side services.

The information system 16 may include an electro-optical obstacles detection system 36 for optically detecting road obstacles for head-way holding. The optical sensor 12 and optical detection system 36 are optional features to enhance advance warning of road obstacles or obstructions. The optical detection system 36 may provide the vehicle dynamic control system 26 with obstacle information. The obstacle detection system 36 provides for advance detection and warning of road obstacles for dynamic vehicular control for automatic avoidance control of the vehicle. The optical detection system 36 may be further enhanced to detect other vehicles on the same road or to detect road lane positioning. The vehicle could then be automatically controlled to stay within a lane preventing deviation from the road lane. The vehicle could also be automatically controlled to maintain a safe but efficient proximity to other vehicles, for example, the vehicle just ahead, for dynamic speed control, similar to cruise control but maintaining the vehicle at a safe distance. The optical detection system 36 may be based upon radar using optical or RF transmission and reception techniques.

The optical detection system 36 is preferably but optionally integrated into the information system 16 having a primary function of route guidance.

The vehicle information system 16 also receives information from a driver operating system 38 which is a collection of driver interface systems including a driver steering system 40, a driver throttle system 42 and a driver braking system 44 collectively for monitoring and interacting with driver manipulation of the steering wheel, brake pedal and throttle, not shown. The driver operating system 38 also includes a map storage system 46 for storing digitized road maps, a driver display 48 for displaying map portions surrounding the current position of the vehicle and other information, and an entry device 50 for manual entry of information, for example, a desired destination point, and optional information, for example, a desired cruise control speed.

The display device 48 displays a relevant vicinity map portion of the digitized map. The display device 48 displays the planned route and current position cursor within the displayed vicinity map portion. The planned route and current position cursor would be distinguished by highlighting within the displayed vicinity map. The cursor preferably takes the form of an arrow particularly useful for directional orientation and road side determination, for example, northbound direction and northbound side of the road. Directional orientation of the current position is also useful to road side emergency care providers attempting to locate and reach an incident on a major thoroughfare.

Additionally or alternatively, the display device 48 could have a speaker audibly informing the driver of pending turns in advance to audibly direct the driver along a planned route. Programmed voice synthesization could be cost-effectively limited to a relatively few distance and turning words to minimized distraction of the driver when guided along the planned route. For example, a message may be "turn left in 300 feet", then later, "turn left in 100 feet", as the vehicle approaches a planned left turn.

The map storage system 46 is preferably a CD-ROM reading device reading local area digitized road maps stored on CD-ROM disks having high density storage, though other memory means, such as semi-conductor memory or magnetic memory, may be used. The map storage system 46 may also be a jukebox type mechanism for storage and accessing a plurality of road map memory storage devices. In this manner, a plurality of local area digitized road maps could be used and updated with new maps to keep the desired local area road maps current to new road construction. The digitized maps would include a predetermined level of detail, for example, information would include street blocks, but may not include, for example, individual street addresses. The level of detail of the digitized maps would be within the resolution of the RF satellite and inertial navigation capabilities for accurate correlation between the current position and the digitized map. The combination of the RF satellite and inertial navigation of the present invention takes advantage of any contemplated increased level of the detail of the digitized map.

The driver information system 24 computes dynamic route guidance correlated between variously received vehicular information including the desired destination point from the entry device 50, digitized map information from the map storage system 46, current position information from the vehicle dynamic position system 22, and, traffic flow information from the radio data system 28. The dynamic route guidance can be based upon a variety of route planning algorithms, such as, least stops, least turns, least distance, and preferably least time, or a complex combination thereof.

A vehicle control system 52 includes electronic means for controlling various vehicular actuators for both primary and superseding vehicular control. Preferably, the vehicle control system 52 includes an engine system 54 controlling, for example, vehicular speed, a braking system 56 controlling, for example, anti-lock braking, a stabilization system 58 controlling, for example, suspension stiffness, and a steering system 60 controlling, for example, the direction of all four wheels. The guidance, control and safety system of the present invention would also include a vehicle electromechanical system 62 having a plurality of sensors 64 and actuators 66 for actuating and sensing the vehicular control functions of the vehicle such as engine, braking, suspension and steering control, and for actuating and sensing steering, throttle and braking manual manipulation. The driver control systems 40, 42 and 44 are used to sense driver manipulation, and to provide superseding control over the steering wheel, brake pedal and throttle pedal so as to provide the driver with bio-sensual feedback as to the current operation of the vehicle. The driver acts upon the steering wheel, throttle pedal and braking pedal, not shown, which in turn drive actuators 66e, 66f and 66g for providing primary control of the vehicle through the vehicle control system and through actuators 66a, 66b, 66c and 66d which control the vehicle. The vehicle dynamic control system 26 receives obstacle information from the obstacle detection system 36, receives acceleration and velocity information from the position system 22, receives vehicle driver manipulation information from the driver control systems 40, 42 and 44, including information derived from the sensor 64e, 64f and 64g, and receives vehicle operation information from the vehicle control systems 54, 56, 58 and 60, including information derived from the sensors 64a, 64b, 64c and 64d. The systems 40, 42, 44, 54, 56, 58 and 60 provide feedback to the vehicle dynamic control system 26 for stable dynamic control, based primarily on driver manipulation and secondarily on dynamic inertial, optical and operating condition sensing.

The vehicle control system 52 provides both primary manipulation control and superseding dynamic control over the vehicle using actuators 66a, 66b, 66c and 66d through respective control systems 54, 56, 58 and 60. The vehicle control system 52 provides driver steering, throttle and braking bio-feedback through the superseding control of driver actuators 66e, 66f and 66g using the driver actuator control systems 40, 42 and 44 respectively. Actuators 66e, 66f and 66g are used for steering wheel rotation, brake pedal depression and throttle pedal depression actuation and used for sensing driver manipulation. The driver control system 40, 42 and 44 are used not only to sense the actuators 66e, 66f and 66g, that is, driver manipulation, but are also used for providing electronically controlled bio-sensual feedback to the driver, for example, a dynamic automatically controlled depression of the throttle pedal during cruise control operation to maintain speed up a steep hill so that the driver senses the throttle pedal depression. In this manner, the driver becomes an integral part of the control of the vehicle with manipulated control and bio-sensual feedback. The driver is thus aided firstly by superseding automatic dynamic vehicular electronic controls and secondly by superseding control of the steering wheel, brake pedal and throttle pedal sensed by the driver, through the automatic control of actuators 66e, 66f and 66g, respectively.

Figure 2:
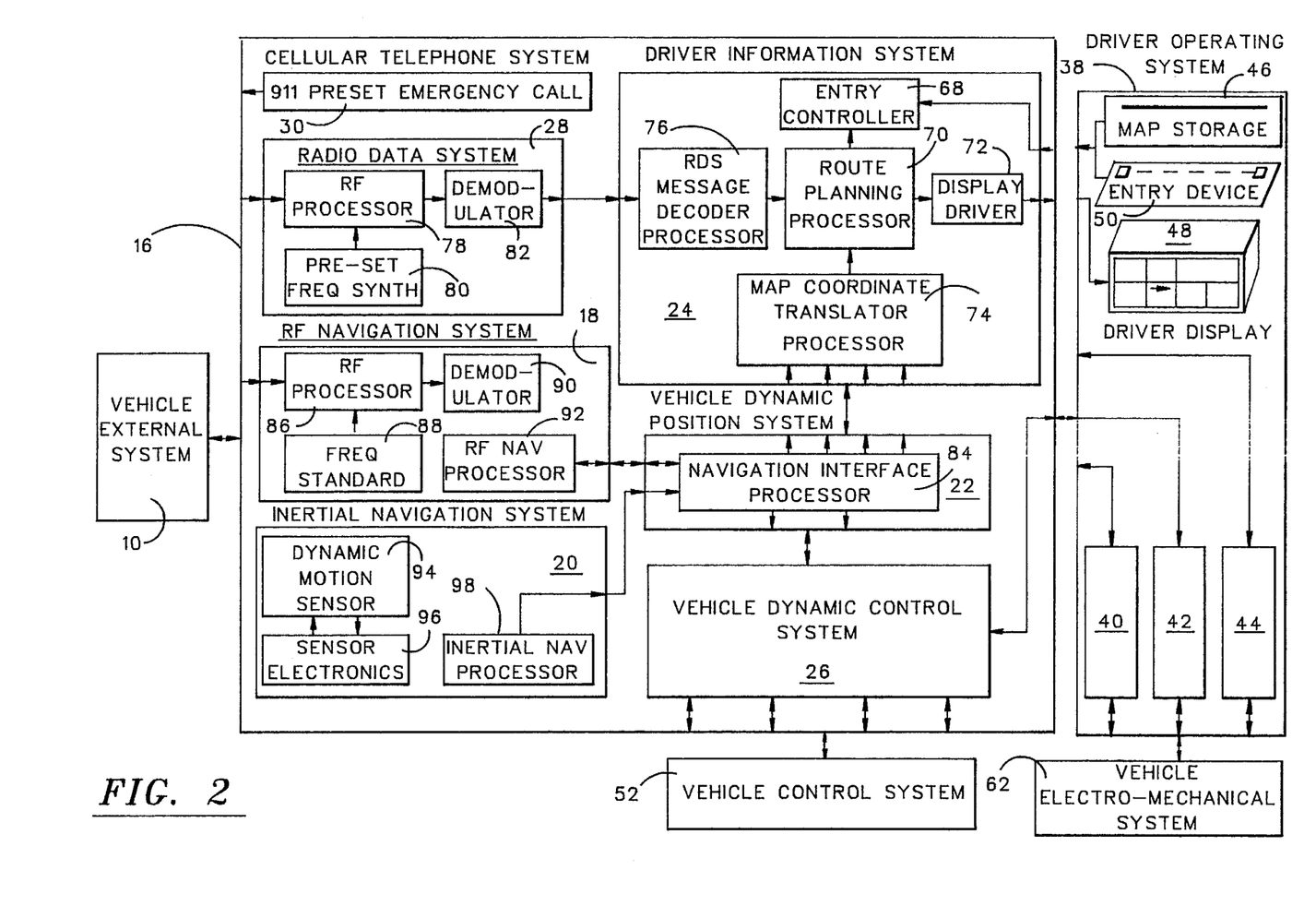
FIG. 2 is an expanded block diagram of the vehicle automobile navigation guidance, control and safety system.

Referring to FIG. 2, the driver information system 24 includes an entry controller 68 for receiving information from the entry device 50 and from the map storage system 46. The entry controller 68 is also used to store emergency call information including entered emergency cellular phone numbers. Once the initial vehicular position is entered, it need not be re-entered, as the system of the present invention will thereafter keep track of the current position of the vehicle, but it may be re-entered if the current position data becomes corrupted, for example, by a memory failure, or by an unlikely extended GPS drop out. After initialization of the system, including entry of the initial position, additional information received would then include destination information from the entry device 50 and digitized road map information both of which would be sent to a route planning and area map processor 70 for route guidance. The route planning processor 70 would drive a display driver 72 used to activate and operate the driver display 48. The route planning processor 70 also receives current vehicular position information from a map coordinate translator processor 74 so that the route planning processor 70 can locate the current vehicle position within a digitized map and appropriately display a vicinity map portion with a current vehicle position among other information, including for example, altitude, heading and speed of the vehicle. The route planning processor 70 also receives dynamic traffic flow information from a radio data system message decoder processor 76 for dynamically rerouting previously planned routes based upon current information received from the radio data system 28. The route planning processor 70 receives three types of information including current position and heading from the map coordinate translator processor 74, current dynamic traffic flow information from the radio data system processor 76, and digitized map and destination information from the entry controller 68, to plan vehicular routes. The route planning processor 70 has an output which drives the display driver 72 to control the driver display 48.

The radio data system 28 includes an RF processor 78 for receiving incoming RF transmissions digitally encoded with traffic flow information which may be encoded, for example, with digitized map coordinates and associated current traffic flow indicator information. A pre-set frequency synthesizer 80 is used to provide a local oscillator signal to the RF processor including mixers to demodulate the RF carrier signal containing the radio data system messages which may be transmitted over an AM radio channel or an FM radio channel. The pre-set synthesizer 80 is used to generate a local oscillator signal for isolating the frequency band in which is transmitted the radio data system digitally encoded traffic flow messages. The RF processor 78 is used to select a frequency band of interest and demodulate the carrier to provide a base signal. A demodulator 82 demodulates the base signal into an encoded digital data stream sent to the radio data system message decoder processor 76 which in turns formats the digital data stream into formatted digital messages for the route planning processor 70.

It is contemplated that radio data system messages would cover a predetermined geographic broadcasting area surrounding a particular broadcasting transmitter. The geographic areas are preferably arranged to cover AM/FM broadcasting areas, or alternatively arranged to cover cellular grids similar to cellular telephone operation. Preferably, the radio data system messages should not exist for traffic free-flow map coordinate points to minimize transmitted information and conserve transmission bandwidth capacity. That is, traffic flow radio data system messages would preferably be broadcasted only when there are traffic flow limitations so as to minimize the amount of data transmitted and to optimize the area covered and conserve broadcast bandwidth capacity.

In the preferred form of the invention, the radio data system may also include an AM/FM radio, not shown, which may be controlled by the entry controller 68 through manual operation of the entry device 50. The entry controller 68 receives information from the keyboard entry device 50 of the driver operating system 38 for AM/FM radio channel selection, local area radio data system channel selection, and presetting 911 emergency call channel information.

The RF navigation system 18 includes an RF processor 86 for demodulating the GPS carrier signals, and includes a frequency standard 88 providing a local oscillator. The RF processor 86 provides coded spread GPS signals to a demodulator 90 for despread demodulation to provide an RF navigation processor 92 with digital GPS range information. The RF navigation processor 92 performs three-dimensional positioning and epoch time computation using four, preferably five, GPS satellite signals.

The inertial navigation system 20 includes a dynamic motion sensor 94, preferably a gyro inertial measuring unit, for example, a two-dimensional gyro multi-sensor, or a micro machine device, digital quartz device, or like inertial measuring unit. Two orthogonally mounted multi-sensors form a GIC-100 system which may be used to generate three-dimensional acceleration and velocity measurements. The dynamic motion sensor 94 is controlled by sensor electronics 96 providing necessary power, such as gyro spin supply, and having pick off electronics for sensing acceleration and velocity signals from the dynamic motion sensor 94. The sensor electronics 96 provides the inertial navigation processor 98 with two-dimensional acceleration and velocity signals, but it may be enhanced to provide three-dimensional information as well. A navigation interface processor 84 of the position system 22 receives three-dimensional positioning and epoch time information from the RF processor 92, and receives two-dimensional acceleration and velocity information from the inertial navigation processor 98. The navigation interface processor 84 provides the vehicle dynamic control system 26 with acceleration and velocity data for vehicular control, and provides the map coordinate translator processor 74 with three dimensional positioning data for route guidance, and with epoch time information for emergency calls.

The altitude dimension measurement is inherently less accurate and is less significant than the planar longitude and latitude dimensions in view of the two-dimensional digitized road maps. Preferably, the inertial measuring unit would have one two-axis gyro for horizontal X-Y acceleration and velocity measuring with the GPS RF navigation system being used for altitude measuring, while both the GPS RF navigation unit 18 and the inertial navigation system 20 are used for accurate longitudinal and latitudinal positioning, consistent with two-dimensional digital map information. However, the digitized maps could be enhanced to include altitude information along with traditional horizontal X-Y coordinate information providing a complete three-dimensional topographical terrain digitized map. The inertial navigation system 20 would then preferably have three-dimensional sensing. Two orthogonal gyros each providing two axis measuring, with one axis in each gyro in coincident alignment, would preferably be used in combination with the topographical digitized road map for improved map matching between the digitized map and the computed position for improved smoothing of the tracking of the vehicle on digitized map roads.

Map digitization and navigation positioning will contain errors. When the route processor 70 compares the navigation position with the available road positions on the map, which may be different due to such errors, the route processor 70 will display the cursor to nearest available map road position, thus smoothing the tracking of the vehicle to the digitized map. This map-matching smoothing process adjusts the display output so that the vehicle is displayed exactly on a road, rather than elsewhere based upon the errors of the navigation positioning and digitized map. The driver is unaware of these errors and is provided with an apparently accurate display which, in probability, accurately displays the current position on a road within the digitized map.

The inertial navigation system 20 aids the GPS processor 92 in determining accurate horizontal two-dimensional positioning. The inertial navigation processor 98 with the inertial sensor 94 provides two-dimensional acceleration information, that is, incremental velocity in two dimensions, and two-dimensional velocity information, that is, incremental displacement in two dimensions. The inertial navigation system 20 communicates this information to the navigation interface processors 84 which in turn, provides the GPS RF navigation processor 92 with this acceleration and velocity information. The GPS RF processor 92 also receives GPS signals from the GPS satellites to compute three-dimensional positions and epoch time. The GPS processor 92 uses this computed information with the acceleration and velocity information provided from the navigation interface processor 84. The GPS RF navigation processor 82 determines accurate two-dimensional information, determines epoch time, and determines less accurate altitude information, and communicates this information to the navigation interface processor 84 which then provides three-dimensional positioning and epoch time information to the driver information system 24. The navigation interface processor 84 also provides two-dimensional acceleration and two-dimensional velocity information to the vehicle dynamic control system 26. C-MIGITS can be used as the RF navigation system 18, the navigation interface processor 84, and the inertial navigation system 20 for inertial sensing, three-dimensional positioning and epoch time monitoring.

During regular operation, the driver would enter destination information through the entry device 50 at the beginning of a trip. That destination information is stored by the entry controller 68 and transferred to the route planning processor 70. The departure position is the current vehicular position at the beginning of a trip known in terms of its three-dimensional position, that is, latitude, longitude and altitude. The route planning processor 70 assimilates both the departure position and the destination position and reads an appropriate vicinity portion of the digitized map from the map storage system 46. The map coordinate translator processor 74 translates the three-dimensional departure position provided by the position system 22 into corresponding map coordinates within the appropriate portion of the digitized map. The map coordinate translator processor 74 also computes a directional compass heading for display and emergency calls use. The map coordinate and compass heading information from map coordinate translator processor 74 is sent to the route planning processor 70. The route planning processor 70 computes and determines a planned route based upon a least time algorithm in the preferred form. As the vehicle moves along or diverges from the planned route, a compass heading computation is made by map coordinate translator processor 74. The reason for the compass computation is that the positioning is not accurate enough to determine which side of the road is being traveled. This compass heading information is useful for driver orientation and for providing precise emergency incident location information.

The compass heading is shown on the display 48 by cursor arrow rotational display. The vehicle cursor position is maintained at the center of a local vicinity displayed portion of the digitized map. The displayed vicinity portion of the digitized map is periodically refreshed and stored in the display driver 72 which controls the corresponding display of the driver display 48 having a current directional cursor at its center representing the present position and direction of the vehicle relative to the displayed vicinity map portion. The route planning processor 70 also receives altitude information from the position system 22. The altitude information may also be displayed. The GPS altitude information is inherently less accurate than the X-Y coordinates, and the altitude need not be displayed.

The route planning processor 70 also receives broadcasted real-time traffic flow and road incident information for the local area through the radio data system 28. This information is preferably encoded for minimum transmission time and is periodically retransmitted with updates as traffic conditions change. The radio data system message decoder processor 76 processes received traffic flow messages and sends the received decoded information to the route planning processor 70 for analysis in route changes and display alerts. Preferably, only traffic flow and road incident information which is pertinent to the driver and the planned route to the destination will be selectively processed by the route planning processor 70 which may display additional information to the driver, in addition to map roads, planned routes and current position. The display 48 may flash warning road blockages, for example, an accident block, or commercial advertising, for example, a motel location, with suitable display designations, for example, like those found along freeway routes. The display 48 may display these designations along a planned route or in close proximity to a planned route. The display could alternatively provide synthesized voice messages of blockages or advertisements as the driver proceeds along the planned route.

The route planning processor 70 will continuously monitor the current position including any deviations from the planned routes, and continuously monitor traffic and road incident information. During this monitoring, the route planning processor 70 will dynamically reroute the planned route based upon the preferred least time routing algorithm to provide real-time rerouting of planned routes. The least time routes may be based upon speed limits, road distances, road turns, and road stops determined from the digitized road maps. The route planning processor 70 may also alert the driver of the vehicle with, for example, a flashing signal or audible buzzer, or synthesized speech, to indicate to the driver of a new route or route blockage. The display may show the highlighted old route and new updated route. Various color display schemes could be used to enhance driver recognition of the routes. An alternative synthesized voice guidance output, not shown, replacing the display 48, could be used, in which case, the driver may not be made aware that the planned route has been changed when following synthesized voice messages.

The vehicle dynamic control system 26 receives inertial acceleration and velocity information from the inertial interface processor 84. The vehicle dynamic control system 26 compares that information to a vehicular dynamic model having predetermined safe operating limits. If the inertial information exceeds those limits, for example, high speed, the vehicle dynamic control system 26 will take responsive vehicular control action, for example, sending commands to lower the suspension system, through sending data commands to the vehicle control system 52. Various models and limits may be employed. If the vehicle is operating within safe limits of longitudinal motion, yaw and roll rates, the vehicle dynamic control system may respond by actuating the vehicle control system 52 to improve the performance of the vehicle by modifying the braking, engine, stabilization and steering capabilities through the vehicle control systems 52. In this manner, the vehicle dynamic control system supersedes the manual controls as sensed by driver systems 40, 42 and 44 of the driver operating system 38.

If the vehicle exceeds a predetermined longitudinal deceleration or an acceptable roll angle, an accident may be presumed. The inertial navigation system 18 of the present invention would have the processing ability to more accurately detect the difference between real and false accident situations through more accurate modeling of expected accident deceleration profiles. Vehicular air-bags, now common in some vehicles, are activated when certain high acceleration differentials are experienced. Common air-bags contain micro-gyros which sense high deceleration states for activating inflation of the air-bags. Similarly, the 911 preset emergency call would be activated upon sensing excessive deceleration. When the inertial navigation system 20 senses unacceptable deceleration or roll angles, and an emergency incident is presumed, the preferred cellular telephone system 30, or like emergency RF communication capability, is activated to automatically transmit an emergency message to the road-side emergency care providers. An emergency signal is sent to the entry controller 68 and then to the telephone system 30 to inform road-side emergency care providers of an emergency situation. The entry controller 68 is used to store pre-set 911 telephone number. The actual telecommunication path would preferably be a unidirectional digital message sent over an existing cellular telephone network with a dedicated channel and phone number, or over a dedicated RF communication system, so as to communicate accurate map coordinates, epoch time and compass heading in a small amount of time. The emergency message would include the current position coordinate location and compass heading of the vehicle along with epoch time, and other known relevant information. The emergency message may also identify the owner of the vehicle through an entered pre-set code, may contain temperature readings from a temperature sensor, not shown, for fire safety, and may contain actual deceleration and roll angle values. The transmission of an automatic emergency message should increase the response time of the road-side emergency care providers especially when the driver is incapacitated due to injury. The cellular telephone system 30 would be dedicated for emergency use, but may be further integrated with a common cellular transceiver, with an optionally attached standard operating voice cellular handset, both not shown, as are in common use. The communication system 30 may also be activated manually through the entry of a command from the entry device 50, perhaps by simple push button. The entry device may be used to manually initiate an emergency message in the case of other road incidents, for examples, during criminal car-jacking attempts, or during the observation of an accident or road-side incident not involving the subject driver or the subject vehicle.

The present invention includes means for GPS and inertial navigation for dynamic routing processing and dynamic vehicular control integrated with emergency transmission signaling. The present invention may be further modified and enhanced with a variety of additional features. While those skilled in the art may make a variety of modifications and enhancements to the present invention, those modifications and enhancements may nonetheless fall within the spirit and scope of the following claims.

What is claimed is:

1. A vehicular guidance, control, and safety system within a vehicle for receiving GPS signals transmitted from GPS satellites, for receiving radio data signals encoded with traffic flow data transmitted from a radio data signal transmitter, the traffic flow data indicating levels of traffic, and for transmitting emergency signals to emergency care receivers, said vehicle having electronic controls connected to vehicular actuators and sensors for controlling the operation of said vehicle, said system comprising:

map storage means for storing digitized road maps having roads digitized as map coordinates, entry means for entering a destination, inertial means for sensing acceleration and velocity of said vehicle and providing acceleration and velocity digital signals to indicate that an emergency has occurred, antenna means for receiving said GPS signals, for receiving said radio data signals, and for transmitting said emergency signals, GPS receiving means connected to said antenna for demodulating said GPS signals into digital GPS signals, radio data receiving means for demodulating said radio data signals into digital radio data signals, emergency transmitter means for transmitting said emergency signals, processor means connected to said GPS receiving means, said emergency transmitter means, said radio data receiving means, said map storage means, and said entry means, said processor means for computing a current position of said vehicle according to said digital GPS signals and said acceleration and velocity digital signals, and for computing a first route through said digitized map coordinates between said current position and said destination, for computing a second route when said traffic flow data indicates high levels of traffic along said first route, for transmitting said emergency signals encoded with said current position when said acceleration exceeds predetermined deceleration limits, and for dynamically controlling the operation of said vehicle through said vehicular electronic controls, wherein said processor means comprises inertial processor means for receiving said acceleration and velocity digital signals and for presenting formatted acceleration and velocity digital signals, GPS processor means for receiving said digital GPS signals, for receiving said acceleration and velocity formatted digital signals, and for computing therefrom a current position of said vehicle, navigation processor means connected to said inertial processor means and said GPS processor means for communicating said acceleration and velocity formatted digital signals to GPS processor means, and for receiving said current position, translator processor means connected to said navigation means for receiving said current position and translating the same into current position coordinates, radio data signal processor means receiving said digital radio data signals and decoding said traffic flow data into traffic flow coordinates, entry controller processor means for communicating said digitized road maps, for translating said destination into destination coordinates and communicating the same, and for communicating said current position coordinates to said emergency transmitter, route processor means connected to said translator processor means for receiving said current position coordinates, connected to said entry controller processor means for receiving said digitized road maps and said destination coordinates, connected to said radio data signal processor means for receiving said traffic flow coordinates, said route processor means for computing a route between said current position coordinates and said destination coordinates within said digitized road maps, and for recomputing a new route between said current position coordinates and said destination coordinates within said digitized road maps but avoiding said traffic flow coordinates, said route processor means also for communicating said current position coordinates to said entry controller processor means for transmitting said emergency signals, and dynamic control processor means connected to said navigation processor means for receiving said acceleration and velocity formatted digital signals, connected to said vehicular electronic controls for controlling the operation and sensing the condition of said vehicle, said dynamic control processor means for sending control signals to said vehicle's electronic controls in response to unstable conditions determined from said acceleration and velocity formatted digital signals and sensed from said sensors, said dynamic control processor means further connected to said entry controller processor means for initiating the transmission of said emergency signals when said acceleration exceeds predetermined deceleration limits.

2. The system of claim 1, further comprising an optical sensor for sensing obstacles and providing obstacle signals, and optical system processor means for providing digital obstacle signals to said dynamic control system operating to control the vehicle to avoid said obstacles.

3. The system of claim 1, wherein said actuators comprise engine, braking, steering and suspension actuators and sensors, wherein said actuators are driver manipulated and electronically controlled, and wherein said vehicular electronic controls control the operation and sense the condition of the engine, braking, steering and suspension actuators.

4. The system of claim 3, wherein said vehicular electronic controls comprise steering, braking and throttle controls to control and sense said actuators, said dynamic control processor means controlling the vehicle based upon driver manipulated sensed actuators and upon computed unstable conditions.

* * * * *